June 8, 1948.  H. A. SHABAKER  2,442,784
PRODUCTION OF GELS
Filed Aug. 12, 1944  2 Sheets-Sheet 1
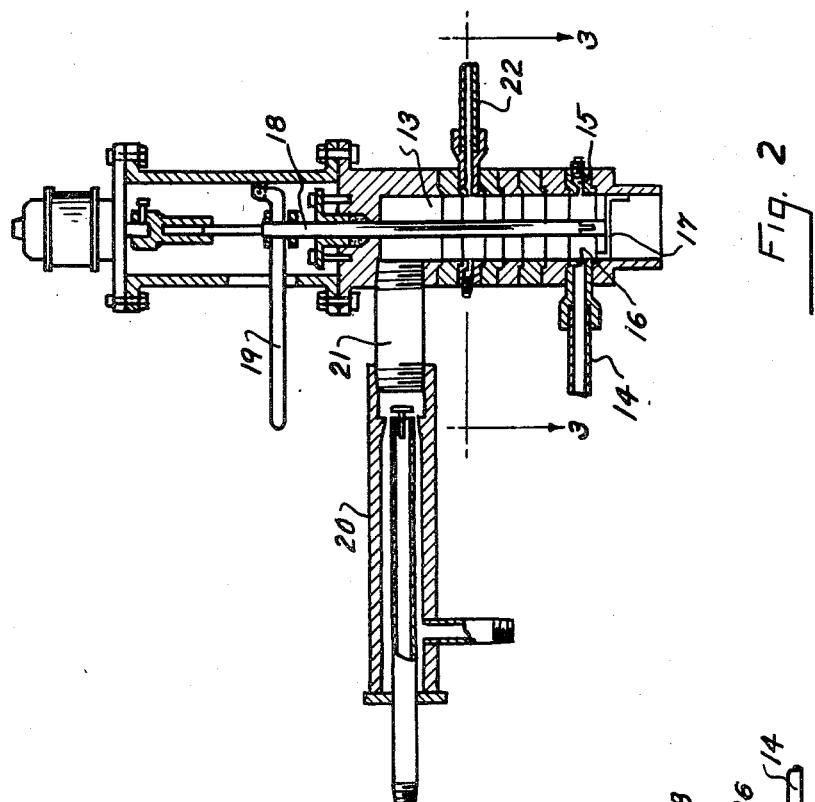
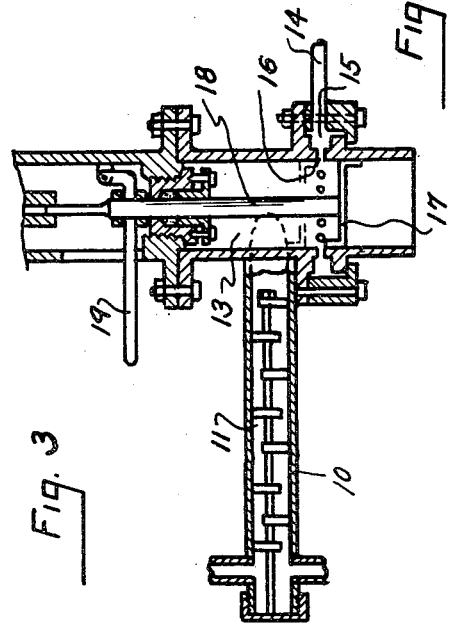
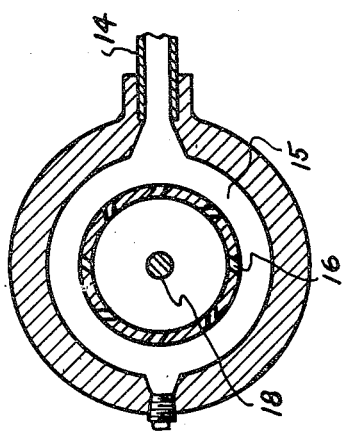
INVENTOR
HUBERT A. SHABAKER
BY
ATTORNEY June 8, 1948.  H. A. SHABAKER  2,442,784
PRODUCTION OF GELS Filed Aug. 12, 1944  2 Sheets-Sheet 2

INVENTOR
HUBERT A. SHABAKER
BY
ATTORNEY

Patented June 8, 1948

2,442,784

UNITED STATES PATENT OFFICE 2,442,784

PRODUCTION OF GELS

Hubert A. Shabaker, Media, Pa., assignor to Houdry Process Corporation, Wilmington, Del., a corporation of Delaware Application August 12, 1944, Serial No. 549,280

4 Claims. (Cl. 252—317)

The present invention relates to new and improved methods for the production of inorganic gels from reactant solutions. The method involves the continuous and rapid production of the gels in a form suitable for processing to dried gel for the production of contact materials such as catalysts for use in chemical conversion processes, for example, hydrocarbon conversions. It is well recognized that gels for such uses must be prepared under carefully selected reaction conditions in order to insure that the contact materials produced will be duplicated with regularity.

Prior methods for mixing solution or liquids to form the viscous or stiff masses have been proposed. These methods include batch processes which are adapted particularly for concentrated solutions which set rapidly. These batch processes are objectionable in that it is necessary to use only small quantities of mixture. Also continuous processes are known which are adapted particularly for dilute solutions which set slowly. These continuous methods can be used practically only with reactant solutions which are in such dilute form that gel formation does not take place for a substantial period of time after the solutions are mixed. The equipment used in prior continuous processes has not been adaptable to the mixing of concentrated reactant solutions, since with such solutions accumulations of gelatinous deposit in the equipment occurred so rapidly that flow through the equipment was seriously restricted even to the point of complete or substantially complete stoppage within very short periods.

The present invention is an improvement over that disclosed in Patent No. 2,232,737 issued February 25, 1941 to Albert G. Peterkin and Hubert A. Shabaker and is in part a continuation of application Ser. No. 398,731, filed June 19, 1941 (patented February 27, 1945, No. 2,370,200) which, in turn, is in part a continuation of application Ser. No. 349,794, filed August 2, 1940 (now abandoned).

Objects of the present invention are to provide improved methods for conducting gel forming reactions to produce rapidly and continuously inorganic gel of uniform quality. Other objects and advantages of the present invention will be obvious as the description proceeds.

In accordance with a specific form of the present invention inorganic gels are formed by continuously introducing into a reaction zone reactant solutions which form an inorganic gel, mixing the reactant solutions in said zone and passing the mixed reactant solutions to a setting zone of constant cross sectional pattern. The reactants are fed to the reaction zone at a rate such that setting of the solutions to inorganic gel is effected within said setting zone, whereby a plug of inorganic gel is continuously formed in said setting zone. The plug continuously slides out of the setting zone as further reactant solutions are fed to the reaction zone, the plug confining the said reactants in the setting zone, whereby the zones are constantly maintained full of reactant solution and gel.

A suitable form of apparatus within which to conduct the present process is shown in the accompanying drawings in which;

Fig. 1 is a vertical section through the reactor,

Fig. 2 is a vertical section of a modified form of reactor,

Fig. 3 is an enlarged horizontal section at line 3—3 in Fig. 2,

Figure 4:
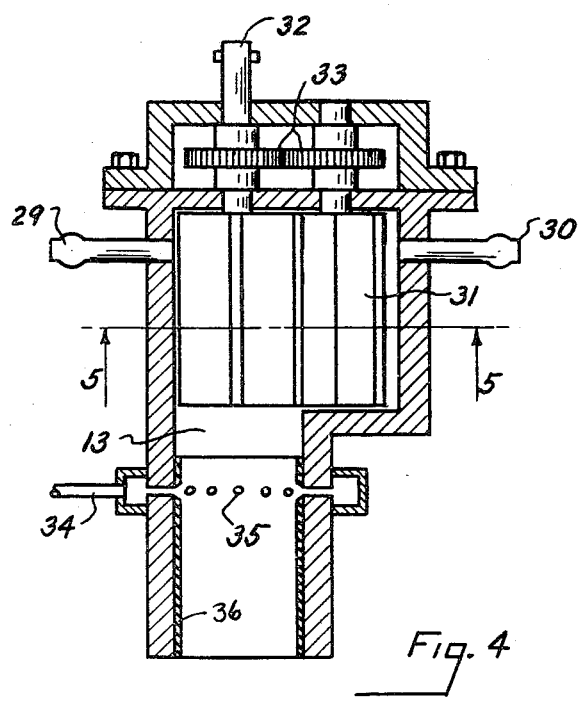
Fig. 4 is a vertical section through another form of suitable apparatus.
Figure 5:
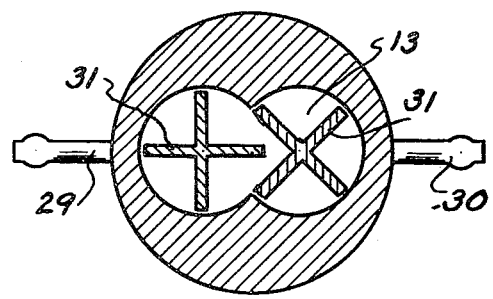
Fig. 5 is a section on the line 5—5 of Fig. 4.

Referring to Fig. 1, wherein is disclosed one form of apparatus for carrying out the process of this invention, a preliminary mixing chamber is formed of a horizontally disposed casing 10 providing a chamber 11. Within this mixing zone, a preliminary reaction of reactants mixed therein may occur. This casing 10 is secured to a vertically disposed casing forming a chamber 13 in communication with the chamber 11. One or more reactant solutions, for example, a solution of a soluble metal salt or other metal compound in solution or dispersion is admitted, preferably tangentially as shown to the chamber 13 from the chamber 11. During the travel of the reactant solutions through chamber 13 there is injected into this solution, under conditions of high velocity which produces turbulence and instantaneous mixing, another stream of reactant solution supplied through line 14, which will react with the solution in chamber 13 introduced from the chamber 11 whereby to form an inorganic gel. The chamber 13 thereby provides at approximately the site of introduction of the reactant solution supplied through line 14, a reaction zone wherein turbulent mixing of the reactants occurs and setting of the gel is initiated contiguous thereto.

The gels formed in accordance with the present invention are distinguished from gelatinous precipitates in that the present gels set as a body including all the materials of the reactant solutions, whereas the gelatinous precipitate, upon precipitation, appears as a suspension in the liquid of the reactant solutions from which it is precipitated. The present invention does not involve this type of gelatinous precipitate. However, within the scope of the term gel, as herein employed, gelatinous precipitate may be included within the body of a gel.

In general, in the operation of the type of reactor shown in Fig. 1, the compounds which are precipitated to form the inorganic gel are introduced through the chamber 11. Exemplary of such materials are sodium silicate and sodium aluminate or aluminum sulfate by the use of which there is formed a silicious plural gel containing silica and alumina. These materials may be mixed in the chamber 11 and introduced therefrom into the chamber 13. A suitable setting solution such as ammonium sulfate is introduced through the line 14. Likewise, other materials for such purposes as adjustment of pH may be introduced through line 14 into the chamber 13. The solutions are fed to the chamber 13 at a rate sufficiently low that, with the outlet of solution from the chamber 13 restricted so that the chamber 13 is maintained full at all times, sufficient time elapses before the reactant solutions arrive at the outlet end of the chamber 13 that the solutions set to a gel. When so operated, the portion of the chamber from about the inlets 16, which communicate with the line 14 through manifold 15, to the outlet of the chamber functions as a setting zone. At the outlet the gel has substantially completely set and forms a plug, which plug retains the reactant solutions in the chamber 13, with the chamber 13 substantially full at all times.

Obviously, other reactant solutions may be employed for producing gels of the variety here in question. For example, a soluble silicate, a zirconium salt, and a setting agent may be employed to produce a plural gel of silica and zirconia. Likewise, other silicious plural gels may be formed by reacting other metallic parts with a soluble silicate, for example, salts of thorium, titanium, beryllium, and the like. Likewise, combinations of silica with two or more of these materials may be produced. Broadly within the scope of this invention any solutions may be employed which set to an inorganic gel of the type embracing all of the reactant solutions.

In the specific form of gel spraying nozzle shown in Fig. 1 a blade 17 is provided, having its ends turned at an angle to wipe close to the walls of chamber 13 in the reaction zone at the position where setting commences. The blade 17 is set upon motor driven shaft 18 for rotation whereby it cleans the walls of the reaction zone at the point of initiation of setting in case any deposit is formed thereon. A handle 19 is provided for moving the shaft 18 vertically to effect wiping across the inlets 16.

In the modification shown in Fig. 2 a modified form of mixing chamber 20 is provided communicating with the chamber 13 by a nipple 21. The chamber 13 is provided with inlets at a plurality of levels for reactant solutions. For example, a solution of aluminum sulfate and a solution of zirconium sulfate may be mixed in the chamber 20 and introduced into the chamber 13. There may then be introduced through the line 22 a solution of sodium silicate and through the line 14 a suitable setting solution such as ammonium sulfate. Likewise, all of the gel forming compounds may be introduced through the mixing chamber 20 and a solution of an inert soluble salt, such as sodium chloride or sulfate, may be introduced through the line 22 for the purpose of modifying the physical or catalytic properties of the gel resulting from drying the hydrous gel formed by the process of the present invention.

In the modification shown in Fig. 4 the gel spraying nozzle involves a chamber 13, into which reactant solutions are introduced through lines 29 and 30 at the upper end thereof. Mixing paddles 31 are provided in the upper portion of the chamber 13 which may be driven by shaft 32 and synchronized by gears 33. At a lower level of the chamber 13 there is provided inlet means 34 for introducing a reactant such as a setting solution. The lower portion of the chamber 13 provides a setting zone which extends from about the level of openings 35, communicating with the inlet 34, to the lower end of the chamber 13. If the reactants tend to deposit gel on the surface of chamber 13, such deposit may be prevented by coating the inner wall of the chamber with a water repellant material 36 such as wax, paraffin, and resins characterized by being water repellents. The coating prevents any deposition occurring.

Regardless of whether the sol is characterized by fast or slow setting to gel, it may be employed in the process of this invention. With a slow setting sol, the rate of flow within the chamber 13 is reduced to such a point that the gel forms within the lower end of the chamber. The best economical results are obtained, however, by increasing the rate of setting either by elevating the temperature or by adding suitable setting agents.

The most convenient position for operation of the device for the present process is with the outlet positioned at the lower end as shown in the drawings. With the device in this position, when the reactants first flow into and through chamber 13, no formation of gel within the chamber ordinarily will occur. After flow of the reactants is started, outlet thereof from the chamber should be restricted as by placing the hand or other suitable obstruction below the nozzle to retain the reactant solutions within the nozzle for the requisite time, allowing flow out of the nozzle only as the solutions are pumped thereinto. There will then form, if the rate of flow is sufficiently low, a gel plug in the outlet of the nozzle. The obstructing hand or the like may then be removed from the outlet of the nozzle and the plug of gel will function from then on to obstruct flow and prevent emptying of the nozzle under action of gravity. Inasmuch as the nozzle, from the point where the gel commences to form to the discharge outlet thereof, is of constant cross section, the gel leaves the nozzle without breakdown of the gel structure.

I claim as my invention:

1. The method of preparing an inorganic gel which comprises, continuously introducing into a confined zone liquid compositions reacting to form a gel, vigorously agitating the compositions in the presence of a setting agent introduced into said zone to form a complete all embracing gel in said zone immediately adjacent the site of said agitation, maintaining the gel as formed as a continuous moving column of gel of substantially uniform cross-section, continuously extruding the said column of gel by the pressure of feeding of the introduced reactant liquid compositions, the formed column of gel preventing discharge of unreacted components of said liquid compositions by confining the same within said confined zone longitudinally in the direction of movement of the column.

2. The method of preparing a siliceous gel which comprises introducing a liquid composition containing gel-forming reactants including a soluble silicate into a confined zone, introducing into said zone a solution of a salt which accelerates setting of gel produced from said reactants, vigorously agitating said liquid composition together with said solution to form a complete all embracing gel rapidly setting immediately adjacent the site of agitation, perimetrically confining the gel as formed to produce a continuous moving column of gel of substantially uniform cross section, continuously extruding the formed column of gel without substantial deformation of its cross section, and controlling the extrusion rate of the formed gel against the resistance incident to its perimetric confinement by the pressure of feeding of the liquid composition reactants into said zone.

3. The method of preparing an inorganic gel which comprises admixing in liquid composition inorganic gel-forming reactants, continuously feeding the liquid composition comprising the product of said admixing into a confined zone, introducing into said confined zone an agent for effecting quick setting of the gel and rapidly agitating the introduced agent and said liquid composition to effect intimate admixture and to initiate setting of gel immediately adjacent the site of agitation, continuously moving the gel as formed as a continuous column of uniform cross section to discharge the same from said confined zone, the rate of movement of the column of gel being controlled by the pressure of feeding of materials including said liquid composition into said confined zone, the formed column of gel thereby serving to confine liquids within said zone longitudinally in the direction of movement of said column.

4. The process of forming an inorganic gel which comprises, continuously introducing into a confined zone liquid compositions reactable to form a gel, vigorously agitating the compositions to form a complete all-embracing gel adjacent the site of agitation, maintaining the gel as formed as a continuous moving column of gel of substantially uniform cross section by confining the gel transversely in the path of movement of the column by contact with water repellent surfaces thereby preventing deposition of gel along said path of movement, continuously extruding the said column of gel by the pressure of feeding of the introduced reactant liquid compositions, the formed column of gel preventing discharge of unreacted components of said liquid compositions by confining the same within said zone longitudinally in the direction of movement of the column.

HUBERT A. SHABAKER.

REFERENCES CITED

The following references are of record in the file of this patent:

UNITED STATES PATENTS

| Number | Name | Date |
|---|---|---|
| 1,674,558 | Miller | June 19, 1928 |
| 1,756,625 | Behrman | Apr. 29, 1930 |
| 2,232,727 | Peterkin et al. | Feb. 25, 1941 |
| 2,254,996 | Clayton | Sept. 2, 1941 |
| 2,258,111 | Engel | Oct. 7, 1941 |
| 2,326,523 | Connolly et al. | Aug. 10, 1943 |
| 2,352,865 | Smith | July 4, 1944 |